(12) United States Patent
Lee

(10) Patent No.: US 11,941,153 B2
(45) Date of Patent: Mar. 26, 2024

(54) DE-IDENTIFICATION METHOD FOR BIG DATA

(71) Applicant: BOALA CO., LTD., Seoul (KR)

(72) Inventor: Won Suk Lee, Seoul (KR)

(73) Assignee: BOALA CO., LTD., Seoul (KR)

( * ) Notice: Subject to any disclaimer, the term of this patent is extended or adjusted under 35 U.S.C. 154(b) by 324 days.

(21) Appl. No.: 17/608,040

(22) PCT Filed: May 31, 2019

(86) PCT No.: PCT/KR2019/006586
§ 371 (c)(1),
(2) Date: Nov. 1, 2021

(87) PCT Pub. No.: WO2020/241943
PCT Pub. Date: Dec. 3, 2020

(65) Prior Publication Data
US 2022/0215128 A1 Jul. 7, 2022

(51) Int. Cl.
*G06F 21/62* (2013.01)
(52) U.S. Cl.
CPC ................ *G06F 21/6254* (2013.01)
(58) Field of Classification Search
CPC ....... G06F 21/6254; G06F 16/22; G06F 17/18
See application file for complete search history.

(56) References Cited

U.S. PATENT DOCUMENTS

| 2012/0131481 | A1 | 5/2012 | Gupta et al. |
| 2015/0235049 | A1 | 8/2015 | Cohen et al. |
| 2015/0324607 | A1 | 11/2015 | Mushkatblat et al. |
| 2020/0183926 | A1* | 6/2020 | Dautelle ............. G06F 21/6227 |

FOREIGN PATENT DOCUMENTS

| KR | 10-2017-0078983 A | 7/2017 |
| KR | 10-1784265 B1 | 10/2017 |
| KR | 101784265 B1 * | 10/2017 |
| KR | 10-2018-0060390 A | 6/2018 |

* cited by examiner

*Primary Examiner* — Mohammed Waliullah
(74) *Attorney, Agent, or Firm* — NKL LAW; Jae Youn Kim

(57) ABSTRACT

Provided is a de-identification method for big data, for anonymizing the big data so that the big data may be freely distributed to an external system without concern about personal information leakage and enabling a statistical value calculated from the distributed data to be maximally close to a statistical value of original data to thereby secure the reliability of statistical analysis. Records in which values of abstraction reference fields are all the same and the number thereof is less than or equal to N are separately grouped without being excluded from being abstracted, and a connection-type attribute value including an occurrence rate value of a corresponding category attribute value in a group is allocated as an attribute value of an abstracted record to minimize abstraction missing data, so that the statistical value calculated from the distributed data becomes maximally close to the statistical value of the original data.

4 Claims, 3 Drawing Sheets

DE-IDENTIFICATION METHOD FOR BIG DATA

TECHNICAL FIELD

The present invention relates to a de-identification method for big data, and more particularly, to a de-identification method for big data for reliably anonymizing the big data so that the big data may be freely distributed to an external system without concern about personal information leakage and enabling a statistical value calculated from the distributed data to be maximally close to a statistical value of original data to thereby secure the reliability of statistical analysis.

BACKGROUND ART

Big data refers to data including all of structured data used in the existing corporate environments or public institutions, as well as unstructured or semi-structured data that has not been utilized before, such as electronic commerce data, metadata, weblog, radio identification (RFID) data, sensor network data, social network data, social data, Internet text and documents, and Internet search indexing. The above data is generally referred to as big data in an aspect of having a level of data that is difficult to handle with ordinary software tools and computer systems.

Recently, attempts are being made not only by companies but also by the government to actively utilize the collected big data information and statistical analysis data using the same for decision-making, policy-making, and the like. In addition, the big data processing technology for building a data-centric computing environment using big data is being actively studied.

Meanwhile, big data is analyzed and utilized within the organization that collects the data, but the nature of the collected data differs depending on the organization that collects the data, so it is necessary to use data of other organizations. Even for organizations that do not have the ability or system to collect data, there is a growing need to analyze information uniquely needed by the organization from other organizations' big data or a combination thereof and use the analyzed information for decision-making.

However, due to the nature of big data, the amount of data is vast and most big data inevitably includes personal information, so there is a high possibility of legal disputes arising from the leakage of personal information. Thus, there is a limit to the exchange or distribution of big data between organizations.

Accordingly, for organizations capable of collecting big data, in order to avoid legal disputes due to the leakage of personal information, most big data are processed and provided at the level of statistical information rather than processing and distributing big data for business purposes. For organizations that need the use of big data, it is difficult to obtain the analysis data required for the organization's unique business environment.

In order to solve the above problems, a system and a method of processing big data for grouping data or anonymizing (de-identifying) individual attributes through masking, substitution, anti-identification, and typification are being applied in some fields.

The masking refers to masking or deleting target information (e.g. 670101-10491910→***************). The substitution refers to substituting the target information with information generated in response thereto (e.g. 670101-10491910→ID2311331). The semi-identification refers to semi-identify the target information so that only part of the target information is indicated (e.g. 670101-10491910→67-1). The typification refers to a method of categorizing and classifying the target information (e.g. 670101-10491910→male).

However, even when the personal information is de-identified by the masking, substitution, semi-identification, typification, or the like, there is a risk of leakage of the personal information through mash-up or traceability through specific personal information and a combination thereof. In addition, it is difficult to link and analyze pieces of big data that are independently generated in separate environments.

As the invention for solving the above conventional problems of big data de-identification scheme, the inventor of the present invention has disclosed and filed a 'DE-IDENTIFICATION PROCESSING METHOD OF BIG DATA' of Korean Patent Unexamined Application No. 10-2016-0071747 on Jun. 9, 2016 and received the registration of Korean Patent Registration No. 10-1784265 on Sep. 27, 2017.

The conventional invention of the above inventor is the invention made based on the fact that big data used for distribution is designed for statistical analysis rather than utilization of specific information about individuals, and there is no significant difference in the results in the statistical analysis of the whole data is performed, even when the statistical analysis is first performed with respect to parts of data and then the analyzed parts are combined and analyzed. The above invention has the feature that the big data for distribution is generated by selecting a field that can be a standard for statistical analysis and a field that can be a target of statistical analysis among various fields constituting big data, in which, as illustrated in Table 1 below, a plurality of original records are abstracted into one abstracted record that can maintain the original meaning of statistical analysis while having field values different from the values of the original records.

TABLE 1

| | | | | | |
|---|---|---|---|---|---|
| 40s' | male | A01 | Gongdeok-dong, Mapo-gu, Seoul Sinsa-dong, | 3300 | ⑤ |
| 40s' | Male | A02 | Eunpyeong-gu, Seoul Sinsa-dong, | 4400 → | id123 40s'male Seoul 3500 |
| 40s' | Male | A03 | Eunpyeong-gu, Seoul | 6500 | ⊿ |
| 30s' | female | A04 | Dolsan-dong Saha-gu, Busan | 3500 → | Excluded(N is less than 3) |
| 40s' | female | A05 | Pil-dong Jung-go, Seoul | 6500 | ⑤ |
| 40s' | female | A06 | Gongdeok-dong, Mapo-gu, Seoul Sinsa-dong, | 7200 → | id561 40s' female Seoul 5600 |
| 40s' | female | A07 | Eunpyeong-gu, Seoul | 5250 | ⊿ |
| 40s' | female | A08 | Gongdeok-dong, Mapo-gu, Seoul | 6600 → | Excluded(N is less than 3) |

Table 1 shows an example, in which age, gender, and city are selected as abstraction reference fields, and income is selected as an abstraction target field to select 3 records (N=3) each having the same abstraction reference field, generate one abstraction record from the selected records, and then allocate identifiers (ID) to the abstraction records, respectively.

It shows an example that the age, gender and city as the abstraction reference field indicate that values common to the selected records are allocated, and the representative value of the income field as the abstraction target field is allocated by the average value of the income field value of the selected record.

An identifier (ID) value is generated to uniquely identify each abstraction record.

The de-identification method of big data according to the conventional invention of the present inventor is the very useful invention capable of providing big data for distribution to obtain new information having a value of statistical analysis and to fundamentally prevent leakage of specific personal information and backtracking through combinations thereof.

However, when there are N or less records having the same abstraction reference field upon creation of the abstraction record, the records are simply excluded from the abstraction target. It is confirmed that the accuracy of statistical analysis is slightly lowered when the number of records excluded from the abstraction target increases.

DISCLOSURE

Technical Problem

The present invention is provided to solve the conventional problems of anonymized big data as described above. An object of the present invention is to provide a de-identification method for big data in which re-identification of specific individuals is fundamentally prevented during the distribution of big data by perfectly performing de-identification of data, that is, de-personalization, so as to be safely used for distribution without obtaining individual permission for sensitive personal information.

Another object of the present invention is to provide a de-identification method for big data to appropriately select and process information for analysis uniquely required by each destination in need.

Still another object of the present invention is to provide a de-identification method for big data for anonymizing the big data so that the big data may be freely distributed to external systems without concern about personal information leakage and enabling a statistical value calculated from the distributed data to be maximally close to a statistical value of original data to thereby secure the reliability of statistical analysis.

Technical Solution

The de-identification method for big data, which is performed in a data server having a communication unit, a processing unit, and a storage unit, according to the present invention for achieving the above objects includes: storing, by the processing unit, data collected through the communication unit from a terminal connected through a wired/wireless network in the storage unit of the data server; and a data abstraction step, by the processing unit, of generating a record different from original records by combining at least two records among the original records constituting the data, wherein the data abstraction step includes: setting at least one field among fields of the original record constituting the data as an abstraction reference field, and setting at least one field other than the abstraction reference field as an abstraction target field; selecting at least every two (N) records having same abstraction reference field values among the original record as an abstraction target record group; abstracting the selected N abstraction target record groups into one abstraction record including the abstraction reference field and the abstraction target field, in which a numerical attribute field of the abstraction record is allocated to include at least one value among statistical function values, and the category attribute field of the abstraction record is allocated as a connection-type attribute value including a corresponding category attribute value and an occurrence rate value of the corresponding category attribute value in the abstraction target record group; selecting at least every two (M) records among records in which the number of records having all same values of the abstraction reference fields is N or less, as an abstraction target record group; abstracting the selected M abstraction target record groups into one abstraction record including the abstraction reference field and the abstraction target field, in which a numerical attribute field of the abstraction record is allocated to include at least one value among statistical function values, and the category attribute field of the abstraction record is allocated as a connection-type attribute value including a corresponding category attribute value and an occurrence rate value of the corresponding category attribute value in the abstraction target record group; and storing, by the processing unit, the abstraction record in the storage unit as a record of the abstract data.

According to the above features of the present invention, big data can be provided, wherein the big data for distribution is generated by selecting a field that can be a standard for statistical analysis and a field that can be a target of statistical analysis among various fields constituting big data, in which a plurality of original records are abstracted into one abstracted record that can maintain the original meaning of statistical analysis while having field values different from the values of the original records, so as to obtain new information having a value of statistical analysis and to fundamentally prevent leakage of specific personal information and backtracking through combinations thereof.

In particular, records in which values of abstraction reference fields are all the same and the number thereof is less than N are separately grouped without being excluded from being abstracted, and a connection-type attribute value including an occurrence rate value of a corresponding category attribute value in a group is allocated as an attribute value of an abstracted record to minimize abstraction missing data, thereby enabling a statistical value calculated from the distributed data to be maximally close to a statistical value of original data, so that the reliability of statistical analysis can be secured.

The abstraction reference field refers to a field serving as a reference for performing data abstraction. When a corresponding field in the original record is a continuous numerical data type, it is desirable that the field may be preprocessed through histogram, binning, and clustering techniques to convert a corresponding attribute into discrete categorical data, and then select an abstraction reference field.

The abstraction target field refers to a field subject to statistical value calculation. When the abstraction target field is a numerical data type, it is preferable that a corresponding field value of the abstraction record allocates at least one or more values of statistical function values such as average value, deviation, maximum, minimum, mean, standard deviation, median, quartile-quartile distance (Q3–Q1), and |maximum–minimum|. When the abstraction target field is not the numerical data, the abstraction target field may be calculated by applying integration functions such as union, intersection, sampling, frequent behavior elements, clustering, and histogram.

The original record included in one abstraction record may be selected to correspond to the predetermined number for each abstraction record, but may also be selected to include the different number of original records for each abstraction record.

According to another feature of the present invention, the method further includes: a step in which, when two or more abstraction reference fields are present, at least every two (N) among records in which values of abstraction reference fields are all the same are selected as an abstraction target record group to perform the abstraction operation, and then remaining fields except for any one of the abstraction reference fields are set as new abstraction reference fields with respect to the remaining records having not been processed for the abstraction operation, and at least every two (N') among records in which values of abstraction reference fields are all the same are selected as an abstraction target record group to perform the abstraction operation.

According to the above features of the present invention, the abstraction operation may proceed by performing the grouping according to the abstraction reference field in multiple steps before any grouping, so that the accuracy of statistical analysis using distributing data can be further improved.

Advantageous Effects

According to the present invention, big data can be provided, in which re-identification of specific individuals is fundamentally prevented during the distribution of big data by perfectly performing de-identification of data, that is, de-personalization, so as to be safely used for distribution without obtaining individual permission for sensitive personal information.

In addition, information for analysis uniquely required by each destination in need can be appropriately selected, processed and provided.

In addition, records in which values of abstraction reference fields are all the same and the number thereof fails to reach the reference value are separately grouped without being excluded from being abstracted, and a connection-type attribute value including an occurrence rate value of a corresponding category attribute value in a group is allocated as an attribute value of an abstracted record to minimize abstraction missing data, thereby enabling a statistical value calculated from the distributed data to be maximally close to a statistical value of original data, so that the reliability of statistical analysis can be secured.

BEST MODE

Mode for Invention

Hereinafter, a method of processing de-identification of big data and a method of calculating statistical information from generated distribution-type big data according to the present invention will be described in detail.

Figure 1:
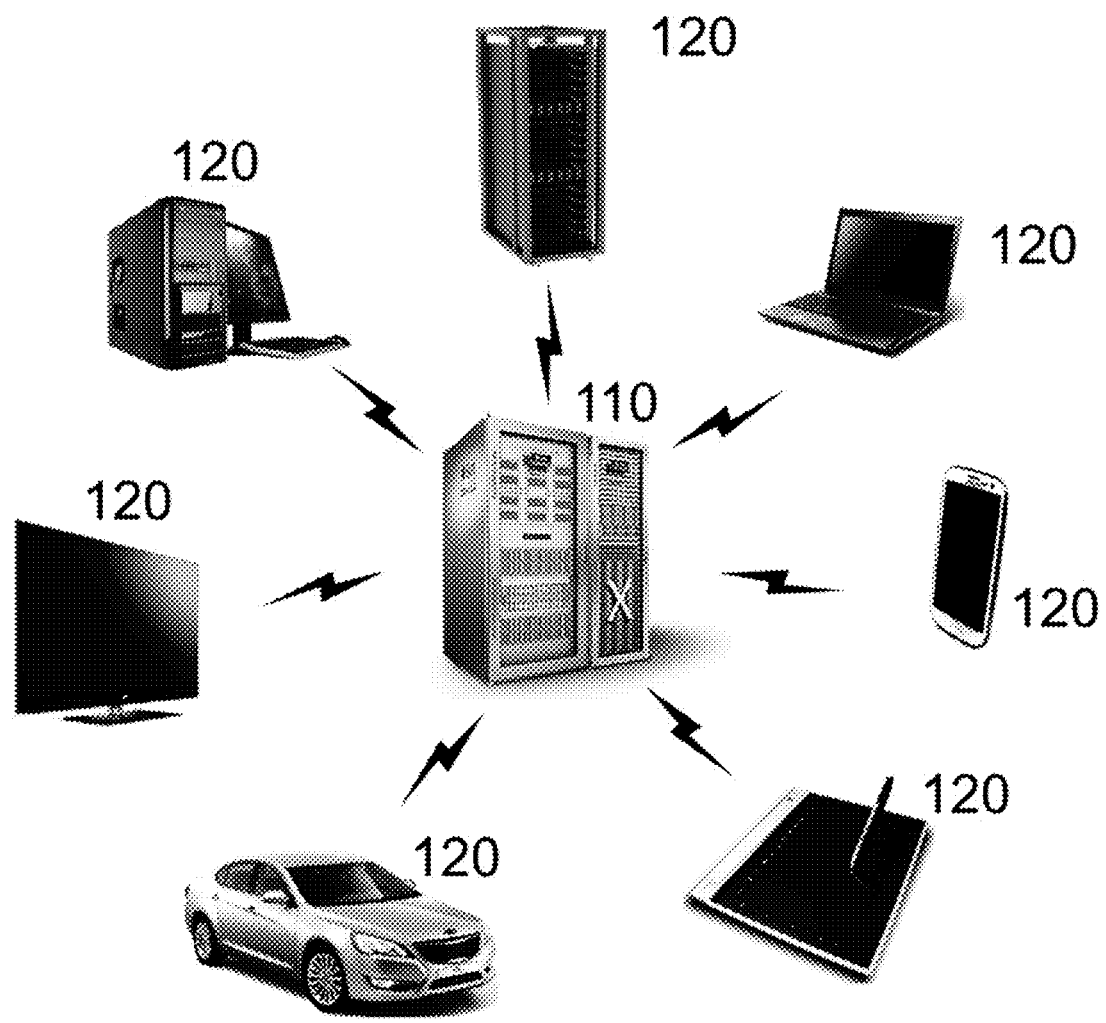
FIG. 1 is an exemplary diagram illustrating a data-centric computing environment that forms a big data processing system of the present invention.

Referring to FIG. 1, the data-centric computing environment that forms the big data processing system of the present invention may be established by a data server 110 and a plurality of user terminals 120 connected to the data server through a wired/wireless network.

The data-centric computing environment refers to a technology based on big data processing capable of providing various applications, such as social network service (SNS), smart grid, intelligent home appliances, and real-time streaming or real-time decision-making, by utilizing data generated in real time from the user terminals 120.

The system and method of processing big data according to the present invention are implemented by the data server 110 connected to the user terminals 120. Data generated from a plurality of user terminals 120 is collected, processed, and stored, and the stored data is provided to a user terminal 120 in need, so that the environment capable of performing the data-centric computing application may be established.

Herein, the user terminal 120 may denote a device mounted with a communication device to be connected to the data server 110, and having an information processing function to generate data according to the operation of the user terminal 120, including information processing terminals such as computers and laptops, mobile communication terminals such as smartphones and tablet PCs, smart home appliances, radio identification (RFID) data, and transportations such as cars, trains, and planes operated with a black box or navigation, but the present invention is not limited thereto.

Figure 2:
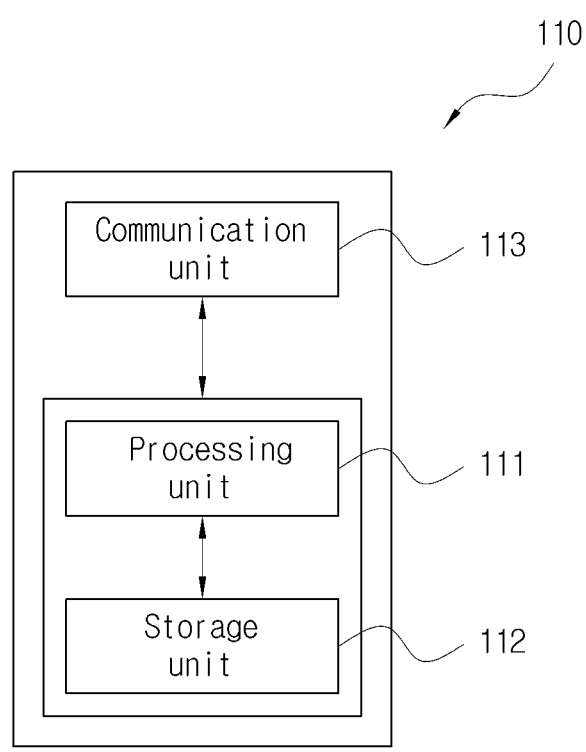
FIG. 2 is a block diagram showing main configurations of a data server shown in FIG. 1.

As shown in FIG. 2, the data server 110 may signify a cloud server or web server that is connected to the user terminals 120 through a wired/wireless network via a communication unit 113 to collect data generated by the user terminals 120 and store the generated data in a storage unit 112, and process and store data collected by a processing unit 111 generally composed of a plurality of processors. However, the present invention is not limited thereto.

Original data collected through the communication unit 113 from the terminals 120 connected through the wired/wireless network is stored in the storage unit 112 of the data server 110.

The processing unit 111 according to the present invention appropriately processes large-capacity big data stored in the storage unit 112, accordingly selects and abstracts data required for analysis to downsize and de-identify the data so as to process the abstracted data into non-identifying big data for distribution, thereby stored the bid data in the storage unit 112. The non-identifying big data for distribution stored in a relatively small capacity in the storage unit 112 is transmitted to destinations in need for analysis and utilization through the communication unit 113 of the server and the communication network.

Figure 3:
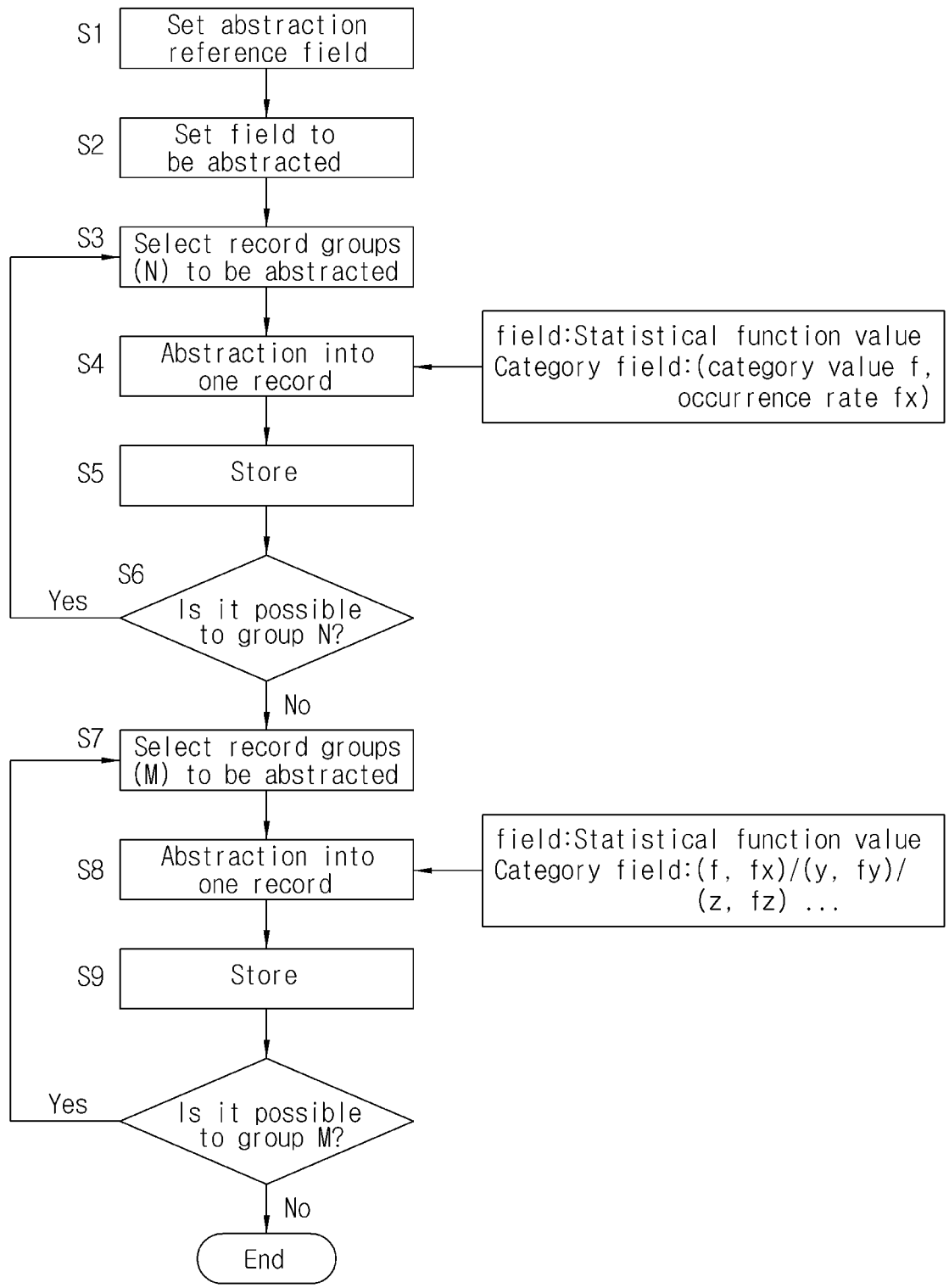
FIG. 3 is a block diagram showing basic steps of data abstraction according to one embodiment of the present invention.

FIG. 3 is a block diagram showing basic steps of data abstraction according to one embodiment of the present invention. Hereinafter, a de-identification processing method of big data performed by the processing unit of the data server will be described in detail with reference to FIG. 3.

First, only the field information uniquely needed from the destination in need of big data is appropriately selected among fields of an original record constituting the data stored in the storage unit 112, in which at least one field is set as an abstraction reference field (S1), and at least one field among fields other than the abstraction reference field is set as an abstraction target field (S2).

The abstraction reference field refers to a field serving as a reference for performing data abstraction. When a corresponding field in the original record is a continuous numerical data type, it is desirable that the field may be preprocessed through histogram, binning, and clustering techniques to convert a corresponding attribute into discrete categorical data, and then select an abstraction reference field.

By the processing unit 111, at least two (N) records in which values of abstraction reference fields are all the same among original records are selected as an abstraction target record group (S3), and the selected records are abstracted into one abstraction record (S4).

It is preferable to have a step of aligning the data based on the value of the abstraction reference field by the processing unit, before the selection step (S3). The original record included in one abstraction record may be selected to correspond to the predetermined number for each abstraction record, but may also be selected to include the different number of original records for each abstraction record.

A numerical attribute field of the abstraction record is allocated to include at least one value of statistical function values such as average value, deviation, maximum, minimum, mean, standard deviation, median, quartile-quartile distance (Q3−Q1), and |maximum−minimum|, and a category attribute field of the abstraction record is allocated as a connection-type attribute value including a corresponding category attribute value and an occurrence rate value of the corresponding category attribute value in the abstraction target record group and stored in the storage unit 112 (S5).

In the above step, since the records in which values of abstraction reference fields are all the same form the abstraction target record group, the occurrence rate value of each category attribute value becomes 1.

When the abstraction record is stored, a pseudonym identifier and information about the number of records included in the abstraction record group may be stored together with respect to each abstraction record, or a pseudonym identifier may be allocated to each record included in the abstraction target record group and then the generated abstraction records may be equally allocated to each record and stored.

The former may save data capacity, but calculations may be cumbersome when using statistics. The latter has a larger data capacity than the former, but calculation may be facilitated when using statistics. Thus, it is possible to apply an appropriate scheme according to situations.

When the number of records in which values of abstraction reference fields are all the same remains N or more, that is, until N grouping is available, the above process is repeated to create the abstraction record.

When the number of records in which values of abstraction reference fields are all the same becomes less than N, that is, when the N grouping is unavailable, at least every two or more (M) of the remaining records are selected as the abstraction target record group (S7), and an abstraction operation is performed (S8).

M is a number greater than N to ensure non-identity of data, and it is preferable to set M to about twice N.

In addition, when the number of remaining records becomes M or less during abstraction, it is preferable to perform M grouping abstraction without performing N grouping abstraction for the N groupable records in order to ensure the non-identity, even when N groupable records are present.

Even in the above case, the numerical attribute field of the abstraction record is allocated to include at least one value among statistical function values. The category attribute field of the abstraction record is allocated as a connection-type attribute value including a corresponding category attribute value and an occurrence rate value of the corresponding category attribute value in the abstraction target record group and stored in the storage unit 112 (S9). Thereafter, steps of S7 to S10 are repeated over the remaining original data. When the data abstraction operation is completed over the entire original data, the operation is terminated (S11).

Meanwhile, in the case of two or more abstraction reference fields, after at least every two (N) among records in which values of abstraction reference fields are all the same are selected as an abstraction target record group (S3 to S6) to perform the abstraction operation, and before performing step S7, the remaining fields except for any one of the abstraction reference fields may be set as new abstraction reference fields with respect to the remaining records having not been processed for abstraction operation, and at least every two (N') among records in which values of abstraction reference fields are all the same may be selected as an abstraction target record group to perform the abstraction operation. According to the above scheme, the abstraction operation may proceed by performing the grouping according to the abstraction reference field in multiple steps, so that the accuracy of statistical analysis using distributing data may be further improved.

The above-mentioned data abstraction process will be described below with a specific example.

Table 2 is a simple example of original data before data abstraction, and shows an example including resident registration number, gender, height, and disease name as each field in the original record, and sorted by disease name and gender as the abstraction reference fields for the convenience of work.

TABLE 2

Example of original data

| Original record# | Pseudonym identifier | Residential registration number | Gender | Height | Disease name |
|---|---|---|---|---|---|
| A1 | R1 | 790812 | male | 158 | Liver cancer |
| A2 | R2 | 860923 | male | 191 | Liver cancer |
| A3 | R3 | 700723 | male | 177 | Liver cancer |
| A4 | R4 | 610123 | female | 157 | Liver cancer |
| A5 | R5 | 563242 | female | 167 | Stomach cancer |
| A6 | R6 | 980111 | female | 175 | Stomach cancer |
| A7 | R7 | 890101 | male | 185 | Normal |
| A8 | R8 | 760732 | male | 161 | Normal |
| A9 | R9 | 640912 | female | 167 | Normal |
| A10 | R10 | 990813 | female | 156 | Normal |
| A11 | R11 | 870404 | male | 155 | Lung cancer |
| A12 | R12 | 990513 | male | 187 | Lung cancer |

The resident registration number, by which an individual can be identified, is not selected as the abstraction target field, and the height that is a statistic target is selected as the abstraction target field.

First, when every three (N=3) records in which the disease name and gender as the abstraction reference fields are all the same are selected as the abstraction target record group from the original data, and the abstraction target record group is shown in Table 3.

TABLE 3

| Original record# | Residential registration number | Gender | Height | Disease name |
|---|---|---|---|---|
| A1 | 790812 | male | 158 | Liver cancer |
| A2 | 860923 | male | 191 | Liver cancer |
| A3 | 700723 | male | 177 | Liver cancer |

Table 4 shows that the numerical attribute field is allocated as mean, deviation, maximum value, and minimum value among statistical function values with respect to the abstraction target record group in Table 3, and the category attribute field is allocated as a connection-type attribute value that includes a corresponding category attribute value, such as male or liver cancer, and an occurrence rate value of the corresponding category attribute value in the abstraction target record group.

For both of the male and liver cancer, which are category attribute values, the intra-group occurrence rate value is 1.

TABLE 4

| Height (mean, deviation, maximum, minimum) | Gender (category, rate) | Disease name (category, rate) |
|---|---|---|
| (175, 16.6, 192, 158) | (male, 1) | (Liver cancer, 1) |

Table 5 shows an example in which the abstraction record generated in the above manner is allocated equally to each record included in the abstraction target record group and stored.

TABLE 5

| Pseudonym identifier | Height (mean, deviation, maximum, minimum) | Gender (category, rate) | Disease name (category, rate) |
|---|---|---|---|
| R1 | (175, 16.6, 191, 158) | (male, 1) | (Liver cancer, 1) |
| R2 | (175, 16.6, 191, 158) | (male, 1) | (Liver cancer, 1) |
| R3 | (175, 16.6, 191, 158) | (male, 1) | (Liver cancer, 1) |

According to the original data in this example, since the number of records having the same abstraction reference field value among the remaining records is less than 3 (N=3) after performing the above abstraction work, no further N grouping is possible. Accordingly, the remaining field except for the disease name among the abstraction reference fields, that is, gender is set as a new abstraction reference field, so that every three records (N'=3) having the same gender field value are selected as an abstraction target record group to perform the abstraction operation. First, when every three records (N'=3) having the same gender as the abstraction reference field are selected as an abstraction target record group from the original data, the abstraction target record group is shown in Table 6.

TABLE 6

| Original record# | Residential registration number | Gender | Height | Disease name |
|---|---|---|---|---|
| A4 | 610123 | female | 157 | Liver cancer |
| A5 | 563242 | female | 167 | Stomach cancer |
| A6 | 980111 | female | 175 | Stomach cancer |

Table 7 shows that, as before, the numerical attribute field is allocated as mean, deviation, maximum value, and minimum value among statistical function values with respect to the abstraction target record group in Table 6, and the category attribute field is allocated as a connection-type attribute value that includes a corresponding category attribute value, such as female or liver cancer, and an occurrence rate value of the corresponding category attribute value in the abstraction target record group.

TABLE 7

| Height (mean, deviation, maximum, minimum) | Gender (category, rate) | Disease name (category, rate) |
|---|---|---|
| (166, 9.0, 175, 157) | (female, 1) | (Stomach cancer, 0.67)/ (Liver cancer, 0.33) |

When different category values x, y, z are present in the abstraction target record group, all category values are concatenated with connection-type attribute values, such as (x, fx)/(y, fy)/(z, fz) . . . , and allocated as connection-type attribute values. In Table 6, since the disease name attribute value is {(stomach cancer, 2 times=⅔=0.67), (liver cancer, 1 time=⅓=0.33)}, values of (stomach cancer, 0.67)/liver cancer, 0.33) are allocated to the disease name attribute value of the abstraction record.

Table 8 shows an example in which the abstraction record generated in the above manner is allocated equally to each record included in the abstraction target record group and stored.

TABLE 8

| Pseudonym identifier | Height (mean, deviation, maximum, minimum) | Gender (category, rate) | Disease name (category, rate) |
|---|---|---|---|
| R4 | (166, 9.0, 175, 157) | (female, 1) | (Stomach cancer, 0.67)/(Liver cancer, 0.33) |
| R5 | (166, 9.0, 175, 157) | (female, 1) | (Stomach cancer, 0.67)/(Liver cancer, 0.33) |
| R6 | (166, 9.0, 175, 157) | (female, 1) | (Stomach cancer, 0.67)/(Liver cancer, 0.33) |

Meanwhile, according to the original data in this example, since the number of records having the same abstraction reference field value, that is, gender field value among the remaining records is less than 3 (N=3) after performing the above abstraction work, no further N' grouping is possible. Accordingly, every six (M=6) of the remaining records are selected as the abstraction target record group and the abstraction operation is performed.

Even in the above case, the numerical attribute field of the abstraction record is allocated to include at least one value among statistical function values. The category attribute field of the abstraction record is allocated as a connection-type attribute value including a corresponding category attribute value and an occurrence rate value of the corresponding category attribute value in the abstraction target record group and stored in the storage unit 112.

Table 9 shows an example in which every six (M=6) of records incapable of further N' grouping due to the number of records, which is less than 3 (N'=3), having the same gender field value are selected as the abstraction target record group. Table 10 shows the results of performing abstraction for the abstraction target record group in Table 9. Table 11 shows an example in which the abstraction record generated in the above manner is allocated equally to each record included in the abstraction target record group and stored.

TABLE 9

| Original record# | Pseudonym identifier | Residential registration number | Gender | Height | Disease name |
|---|---|---|---|---|---|
| A7 | R7 | 890101 | male | 185 | Normal |
| A8 | R8 | 760732 | male | 161 | Normal |
| A9 | R9 | 640912 | female | 167 | Normal |
| A10 | R10 | 990813 | female | 156 | Normal |
| A11 | R11 | 870404 | male | 155 | Lung cancer |
| A12 | R12 | 990513 | male | 187 | Lung cancer |

TABLE 10

| Height (mean, deviation, maximum, minimum) | Gender (category, rate) | Disease name (category, rate) |
|---|---|---|
| (168, 14.2, 187, 155) | (male, 0.67)/ (female, 0.33) | (Normal, 0.67)/ (Lung cancer, 0.17)/ (Pneumonia, 0.17) |

TABLE 11

| Pseudonym identifier | Height (mean, deviation, maximum, minimum) | Gender (category, rate) | Disease name (category, rate) |
|---|---|---|---|
| R7 | (168, 14.2, 187, 155) | (male, 0.67)/ (female, 0.33) | (Normal, 0.67)/ (Lung cancer, 0.17)/ (Pneumonia, 0.17) |
| R8 | (168, 14.2, 187, 155) | (male, 0.67)/ (female, 0.33) | (Normal, 0.67)/ (Lung cancer, 0.17)/ (Pneumonia, 0.17) |
| R9 | (168, 14.2, 187, 155) | (male, 0.67)/ (female, 0.33) | (Normal, 0.67)/ (Lung cancer, 0.17)/ (Pneumonia, 0.17) |
| R10 | (168, 14.2, 187, 155) | (male, 0.67)/ (female, 0.33) | (Normal, 0.67)/ (Lung cancer, 0.17)/ (Pneumonia, 0.17) |
| R11 | (168, 14.2, 187, 155) | (male, 0.67)/ (female, 0.33) | (Normal, 0.67)/ (Lung cancer, 0.17)/ (Pneumonia, 0.17) |
| R12 | (168, 14.2, 187, 155) | (male, 0.67)/ (female, 0.33) | |

Table 12 shows the overall abstraction record table formed by abstracting the original data in Table 2.

TABLE 12

| Pseudonym identifier | Height (mean, deviation, maximum, minimum) | Gender (category, rate) | Disease name (category, rate) |
|---|---|---|---|
| R1 | (175, 16.6, 191, 158) | (male, 1) | (Liver cancer, 1) |
| R2 | (175, 16.6, 191, 158) | (male, 1) | (Liver cancer, 1) |
| R3 | (175, 16.6, 191, 158) | (male, 1) | (Liver cancer, 1) |
| R4 | (166, 9.0, 175, 157) | (female, 1) | (Stomach cancer, 0.67)/ (Liver cancer, 0.33) |
| R5 | (166, 9.0, 175, 157) | (female, 1) | (Stomach cancer, 0.67)/ (Liver cancer, 0.33) |
| R6 | (166, 9.0, 175, 157) | (female, 1) | (Stomach cancer, 0.67)/ (Liver cancer, 0.33) |
| R7 | (168, 14.2, 187, 155) | (male, 0.67)/ (female, 0.33) | (Normal, 0.67)/ (Lung cancer, 0.17)/ (Pneumonia, 0.17) |
| R8 | (168, 14.2, 187, 155) | (male, 0.67)/ (female, 0.33) | (Normal, 0.67)/ (Lung cancer, 0.17)/ (Pneumonia, 0.17) |
| R9 | (168, 14.2, 187, 155) | (male, 0.67)/ (female, 0.33) | (Normal, 0.67)/ (Lung cancer, 0.17)/ (Pneumonia, 0.17) |
| R10 | (168, 14.2, 187, 155) | (male, 0.67)/ (female, 0.33) | (Normal, 0.67)/ (Lung cancer, 0.17)/ (Pneumonia, 0.17) |
| R11 | (168, 14.2, 187, 155) | (male, 0.67)/ (female, 0.33) | (Normal, 0.67)/ (Lung cancer, 0.17)/ (Pneumonia, 0.17) |
| R12 | (168, 14.2, 187, 155) | (male, 0.67)/ (female, 0.33) | |

Hereinafter, a method of calculating statistical values using abstraction records according to the present invention will be described with reference to the abstraction record table in Table 12.

First, the use of numerical attribute values (mean, deviation, maximum, and minimum) for the entire record will be described.

The average value of height for all records corresponds to (sum of height attribute values of each record)/number of records. In the example of Table 12, 2034/12 is equivalent to 169.5, in which the maximum value of height for all records corresponds to 191 that is the largest among the maximum attribute values of height, and the minimum value of height for all records corresponds to 155 that is the smallest among the minimum attribute values of height.

Meanwhile, statistical values of numerical attribute values for partial records such as the average height of females are calculated as in the following example.

The number of females, that is, the number of records in females corresponds to $\Sigma$(female rate)=1*3+0.33*6=5, and the average height of women is $\Sigma$(average height*female ratio)/$\Sigma$(female ratio)=835/5=167. In this case, reliability corresponds to the average value of the female rate of the records used in the calculation, that is, $\Sigma$(female rate)/ (number of records used in calculation)=5/9=4.55. The definitive statistical value of the average female heights refers to an average height value for records having the female rate equal to 1, and corresponds to 166 that is the average height of pseudonym identifiers R4, R5 and R6.

In addition, the definitive statistic value for the maximum female height, that is, the maximum value of 100% reliability corresponds to 175 that is the maximum value among records having the female rate of 1. The possible statistic value of the maximum female height, among records having an attribute value of (female, x), calculates the maximum value v as the attribute statistic value, and calculates the female rate w of the corresponding record as the reliability, thereby being expressed as (v, w), in which the abstraction record table in Table 12 corresponds to (187, 0.33). Likewise, the definitive statistical value for the minimum female height corresponds to (157, 1), and the possible statistical value for the minimum female height corresponds to (155, 0.33).

Table 13 compares the statistical values calculated from the abstraction record table of Table 12 with the statistical values calculated from the original record table of FIG. 2, and shows that the statistical values calculated from the abstract table are similar to the statistical values of the original record so as to be reliably used as statistical data.

TABLE 13

| Statistical value of height | Original table | Abstraction table | |
|---|---|---|---|
| | | Definitive statistic (statistic value, reliability) | Possible statistic (statistic value, reliability) |
| Total average | 169.7 | (169.7, 1) | |
| Total maximum | 191 | (191, 1) | |
| Total minimum | 155 | (155, 1) | |
| Male average | 173.4 | (175, 1) | (171.3, 0.78) |
| Male maximum | 191 | (191, 1) | (191, 1) |
| Male minimum | 155 | (158, 1) | (155, 0.67) |
| Female average | 164.4 | (166, 1) | (167.7, 0.55) |
| Female maximum | 175 | (175, 1) | (187, 0.33) |
| Female minimum | 156 | (157, 1) | (155, 0.33) |

Meanwhile, a method of calculating statistical values using category attribute values of the abstraction record table will be described as follows.

In the abstraction record table in Table 12, the number of records having liver cancer as a disease name corresponds to the sum of corresponding attribute value rates in each record (=3+3*0.33=4), and the number of records having a normal state for the disease name corresponds to the sum of corresponding attribute value rates (=0.67*6=4). In the same way, the number of records having stomach cancer for the disease name corresponds to 2, the number of records having lung cancer for the disease name corresponds to 1, and the number of records having lung cancer for the disease name corresponds to 1.

Accordingly, the abstracted and de-identified big data formed by the present invention facilitates to link and utilize two or more independently generated big data, and the process is as follows.

Table 14 and Table 15 show abstraction record tables A and B for two different big data A and B, respectively. The two tables are combined based on pseudonym identifiers common to the two abstraction record tables and used for statistical analysis.

TABLE 14

| Pseudonym identifier A | Height (mean, deviation, maximum, minimum) | Gender (category, rate) | Disease name (category, rate) |
|---|---|---|---|
| R1 | (175, 16.6, 191, 158) | (male, 1) | (Liver cancer, 1) |
| R2 | (175, 16.6, 191, 158) | (male, 1) | (Liver cancer, 1) |
| R4 | (166, 9.0, 175, 157) | (female, 1) | (Stomach cancer, 0.67)/ (Liver cancer, 0.33) |
| R5 | (166, 9.0, 175, 157) | (female, 1) | (Stomach cancer, 0.67)/ (Liver cancer, 0.33) |
| R7 | (168, 14.2, 187, 155) | (male, 0.67)/ (female, 0.33) | (Normal, 0.67)/ (Lung cancer, 0.17)/ (Pneumonia, 0.17) |
| R8 | (168, 14.2, 187, 155) | (male, 0.67)/ (female, 0.33) | (Normal, 0.67)/ (Lung cancer, 0.17)/ (Pneumonia, 0.17) |
| R9 | (168, 14.2, 187, 155) | (male, 0.67)/ (female, 0.33) | (Normal, 0.67)/ (Lung cancer, 0.17)/ (Pneumonia, 0.17) |
| R10 | (168, 14.2, 187, 155) | (male, 0.67)/ (female, 0.33) | (Normal, 0.67)/ (Lung cancer, 0.17)/ (Pneumonia, 0.17) |
| R11 | (168, 14.2, 187, 155) | (male, 0.67)/ (female, 0.33) | (Normal, 0.67)/ (Lung cancer, 0.17)/ (Pneumonia, 0.17) |

TABLE 15

| Pseudonym identifier B | Gender (category, rate) | Address (category, rate) | Monthly income (mean, deviation, maximum, minimum) |
|---|---|---|---|
| R1 | (male, 1) | (Guui-dong, 1) | (Liver cancer, 1) |
| R2 | (male, 1) | (Guui-dong, 1) | (Liver cancer, 1) |
| R4 | (male, 0.17)/ (female, 0.83) | (Guui-dong, 0.33)/ (Sinchon-dong, 0.17)/ (Jeong-dong, 0.17)/ (Changcheon-dong, 0.33) | (Stomach cancer, 0.67)/ (Liver cancer, 0.33) |
| R5 | (male, 0.17)/ (female, 0.83) | (Guui-dong, 0.33)/ (Sinchon-dong, 0.17)/ (Jeong-dong, 0.17)/ (Changcheon-dong, 0.33) | (Stomach cancer, 0.67)/ (Liver cancer, 0.33) |
| R7 | (male, 0.17)/ (female, 0.83) | (Guui-dong, 0.33)/ (Sinchon-dong, 0.17)/ (Jeong-dong, 0.17)/ (Changcheon-dong, 0.33) | (Normal, 0.67)/ (Lung cancer, 0.17)/ (Pneumonia, 0.17) |
| R8 | (male, 0.17)/ (female, 0.83) | (Guui-dong, 0.33)/ (Sinchon-dong, 0.17)/ (Jeong-dong, 0.17)/ (Changcheon-dong, 0.33) | (Normal, 0.67)/ (Lung cancer, 0.17)/ (Pneumonia, 0.17) |

TABLE 15-continued

| Pseudonym identifier B | Gender (category, rate) | Address (category, rate) | Monthly income (mean, deviation, maximum, minimum) |
| --- | --- | --- | --- |
| R9 | (male, 0.17)/ (female, 0.83) | (Guui-dong, 0.33)/ (Sinchon-dong, 0.17)/ (Jeong-dong, 0.17)/ (Changcheon-dong, 0.33) | (Normal, 0.67)/ (Lung cancer, 0.17)/ (Pneumonia, 0.17) |
| R10 | (male, 0.43)/ (female, 0.57) | (Samyang-dong, 0.14)/ (Sinchin-dong,0.14)/ (Myeonmok-dong, 0.14)/ (Myeong-dong, 0.29)/ (Jeong-dong, 0.29) | (Normal, 0.67)/ (Lung cancer, 0.17)/ (Pneumonia, 0.17) |
| R11 | (male, 0.43)/ (female, 0.57) | (Samyang-dong, 0.14)/ (Sinchin-dong, 0.14)/ (Myeonmok-dong, 0.14)/ (Myeong-dong, 0.29)/ (Jeong-dong, 0.29) | (Normal, 0.67)/ (Lung cancer, 0.17)/ (Pneumonia, 0.17) |

For example, the average value of height for all records of Tables 14 and 15 corresponds to (sum of height attribute values of each record)/number of records, and accordingly, corresponds to 1524.5/9=169.5. The maximum value of height for all records corresponds to 191 that is the largest among the maximum attribute values of height, and the minimum value of height for all records corresponds to 155 that is the smallest among the minimum attribute values of height.

Meanwhile, statistical values of numerical attribute values for partial records, such as the average height of Guui-dong residents, are calculated as in the following example.

The average height of Guui-dong residents corresponds to $\Sigma$(average height*Guui-dong rate)/$\Sigma$(Guui-dong rate)=611.2/3.66=167, and the reliability corresponds to 0.52 that is the average value of the Guui-dong rate applied to the calculation.

In addition, the definitive statistical value for the maximum height of residents in Guui-dong corresponds to 191 that is the maximum value among records having the Guui-dong rate of 1. The possible statistic value of the maximum height of residents in Guui-dong, among records having an attribute value of (Guui-dong, x), calculates the maximum value v as the attribute statistic value, and calculates the Guui-dong rate w of the corresponding record as the reliability, thereby being expressed as (v, w), in which the abstraction record table in Tables 14 and 15 corresponds to (191, 1). Likewise, the definitive statistical value for the minimum height of residents in Guui-dong corresponds to (158, 1), and the possible statistical value for the minimum height of residents in Guui-dong corresponds to (157, 0.33).

Table 16 compares the statistical values calculated from the abstraction record table of Tables 14 and 15 with the statistical values calculated from the original record table (not shown), and shows that the statistical values calculated from the abstract table are similar to the statistical values of the original record so as to be reliably used as statistical data.

TABLE 16

| | | Abstraction table | |
| --- | --- | --- | --- |
| Statistical value of height | Original table | Definitive statistic (statistic value, reliability) | Possible statistic (statistic value, reliability) |
| Total average | 166.3 | (169.4, 1) | |
| Total maximum | 191 | (191, 1) | |
| Total minimum | 155 | (155, 1) | |
| Guui-dong average | 166.7 | (175, 1) | (171.6, 0.52) |
| Guui-dong maximum | 191 | (191, 1) | (191, 1) |
| Guui-dong minimum | 157 | (158, 1) | (157, 0.33) |

Meanwhile, a method of calculating statistical values using category attribute values of the abstraction record table is as follows.

In the abstraction record tables in Tables 14 and 15, the number of records having liver cancer as a disease name corresponds to the sum of corresponding attribute value rates in each record (=2+0.33*2=2.66), and the number of records having Jeong-dong as an address corresponds to the sum of corresponding attribute value rates in each record (=0.17*5+0.29*2=1.43).

In addition, the number of records having 'male' as a gender and 'Guui-dong' as an address corresponds to the sum of the corresponding attribute value rate in each record (1*1*2+0.67*0.33*3=2.67). The number of records having 'female' as a gender and 'Changchoen-dong' as an address corresponds to the sum of the corresponding attribute value rate in each record (1*0.33*2+0.33*0.33*3=1).

For further understanding, the above description has been described with the required minimum records as an example, however, the principles of the present invention may be equivalently applied to big data with a large number of records. In addition, it is confirmed that the reliability of the statistical values calculated from the abstraction record table can be secured as the number of data increases.

The invention claimed is:

1. A de-identification processing method of big data performed in a data server having a communication unit, a processing unit and a storage unit, the de-identification processing method comprising:
    storing, by the processing unit, data collected through the communication unit from a terminal connected through a wired/wireless network in the storage unit of the data server; and
    a data abstraction step, by the processing unit, of generating a record different from original records by combining at least two records among the original records constituting the data, wherein the data abstraction step includes:

setting at least one field among fields of the original record constituting the data as an abstraction reference field, and setting at least one field other than the abstraction reference field as an abstraction target field;

selecting at least every two (N) records having same abstraction reference field values among the original record as an abstraction target record group;

abstracting the selected N abstraction target record groups into one abstraction record including the abstraction reference field and the abstraction target field, in which a numerical attribute field of the abstraction record is allocated to include at least one value among statistical function values, and a category attribute field of the abstraction record is allocated as a connection-type attribute value including a corresponding category attribute value and an occurrence rate value of the corresponding category attribute value in the abstraction target record group;

selecting at least every two (M) records among records in which a number of records having all same values of the abstraction reference fields is less than N, as an abstraction target record group;

abstracting the selected M abstraction target record groups into one abstraction record including the abstraction reference field and the abstraction target field, in which a numerical attribute field of the abstraction record is allocated to include at least one value among statistical function values, and the category attribute field of the abstraction record is allocated as a connection-type attribute value including a corresponding category attribute value and an occurrence rate value of the corresponding category attribute value in the abstraction target record group; and storing, by the processing unit, the abstraction record in the storage unit as a record of the abstract data.

2. The de-identification processing method of claim 1, wherein the statistical function value includes average value, deviation, maximum, minimum, mean, standard deviation, median, quartile-quartile distance (Q3−Q1), and |maximum−minimum|.

3. The de-identification processing method of claim 1, further comprising:

a step in which, when two or more abstraction reference fields are present, at least every two (N) among records in which values of abstraction reference fields are all the same are selected as an abstraction target record group to perform the abstraction operation, and then remaining fields except for any one of the abstraction reference fields are set as new abstraction reference fields with respect to the remaining records having not been processed for the abstraction operation, and at least every two (N') among records in which values of abstraction reference fields are all the same are selected as an abstraction target record group to perform the abstraction operation.

4. The de-identification processing method of claim 2, further comprising:

a step in which, when two or more abstraction reference fields are present, at least every two (N) among records in which values of abstraction reference fields are all the same are selected as an abstraction target record group to perform the abstraction operation, and then remaining fields except for any one of the abstraction reference fields are set as new abstraction reference fields with respect to the remaining records having not been processed for the abstraction operation, and at least every two (N') among records in which values of abstraction reference fields are all the same are selected as an abstraction target record group to perform the abstraction operation.

* * * * *